United States Patent
Fujita et al.

(10) Patent No.: US 9,421,896 B2
(45) Date of Patent: Aug. 23, 2016

(54) SEAT FRAME FOR VEHICLE SEAT

(75) Inventors: Satoshi Fujita, Tochigi (JP); Hiroyuki Itoi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 14/423,889

(22) PCT Filed: Aug. 31, 2012

(86) PCT No.: PCT/JP2012/072245
§ 371 (c)(1),
(2), (4) Date: Feb. 25, 2015

(87) PCT Pub. No.: WO2014/033929
PCT Pub. Date: Mar. 6, 2014

(65) Prior Publication Data
US 2015/0203012 A1    Jul. 23, 2015

(51) Int. Cl.
*A47C 7/02*     (2006.01)
*B60N 2/68*    (2006.01)
(Continued)

(52) U.S. Cl.
CPC .............. *B60N 2/68* (2013.01); *B60N 2/0284* (2013.01); *B60N 2/165* (2013.01); *B60N 2/1615* (2013.01); *B60N 2/22* (2013.01); *B60N 2/2213* (2013.01); *B60N 2/4492* (2015.04); *B60N 2/682* (2013.01); *B60N 2/4228* (2013.01);
(Continued)

(58) Field of Classification Search
CPC ........ B60N 2/68; B60N 2/22; B60N 2/4228; B60N 2/42745; B60N 2/42709; B60N 2/165; B60N 2/4492

USPC ................ 297/284.9, 216.1, 216.15, 452.19, 297/452.18, 452.1, 452.23, 452.2, 284.4
See application file for complete search history.

(56) References Cited

U.S. PATENT DOCUMENTS

| | | | | |
|---|---|---|---|---|
| 6,375,267 B1 * | 4/2002 | Ishikawa | .................. | B60N 2/22 297/452.18 |
| 6,499,807 B1 * | 12/2002 | Kaneda | .................... | A47C 7/46 297/452.49 |

(Continued)

FOREIGN PATENT DOCUMENTS

| JP | 2001-150992 A | 6/2001 |
|---|---|---|
| JP | 2008-067724 A | 3/2008 |

(Continued)

OTHER PUBLICATIONS

Extended European Search Report issued for EP 12883716.8 (Jul. 31, 2015).

*Primary Examiner* — Chi Q Nguyen
(74) *Attorney, Agent, or Firm* — Drinker Biddle & Reath LLP

(57) ABSTRACT

A seat frame for a vehicle seat has side frames disposed on both ends of a seat back frame in the width direction, and a bottom member frame for connecting the bottom ends of the side frames which attach to a seat cushion, wherein: each side frame has a side wall which is positioned on the outside in the width direction and which extends in the vertical direction, and a back wall which extends from the side wall towards the inner side in the width direction; and the lower member frame has a first extension portion extending along the width direction, and second extension portions extending from both ends of the first extension portion in the width direction towards the front. The second extension portions are positioned further inward than the side walls in the width direction and overlap with the side walls.

8 Claims, 9 Drawing Sheets

(51) Int. Cl.
  *B60N 2/16* (2006.01)
  *B60N 2/22* (2006.01)
  *B60N 2/44* (2006.01)
  *B60N 2/02* (2006.01)
  *B60N 2/427* (2006.01)
  *B60N 2/42* (2006.01)

(52) U.S. Cl.
  CPC ...... *B60N 2/42709* (2013.01); *B60N 2/42745* (2013.01); *B60N 2002/0288* (2013.01); *B60N 2205/50* (2013.01)

(56) References Cited

U.S. PATENT DOCUMENTS

| | | | |
|---|---|---|---|
| 7,066,552 B2 * | 6/2006 | Yoshida | B60N 2/64 297/452.18 |
| 7,290,837 B2 * | 11/2007 | Sugiyama | B60N 2/7094 297/284.4 |
| 7,731,292 B2 * | 6/2010 | Ishijima | B60N 2/68 297/216.1 |
| 8,235,467 B2 * | 8/2012 | Akutsu | B60N 2/4885 297/284.4 |
| 8,668,272 B2 * | 3/2014 | Sankaran | B60N 2/0881 297/284.7 |
| 2011/0278886 A1 * | 11/2011 | Nitsuma | B60N 2/4228 297/216.13 |
| 2013/0264849 A1 | 10/2013 | Adachi et al. | |
| 2014/0232158 A1 * | 8/2014 | Sano | B60N 2/68 297/354.1 |
| 2015/0042133 A1 * | 2/2015 | Munemura | B60N 2/4228 297/216.14 |

FOREIGN PATENT DOCUMENTS

| | | |
|---|---|---|
| JP | 2008-201216 A | 9/2008 |
| JP | 2010-173431 A | 8/2010 |
| JP | 2010-179752 A | 8/2010 |
| JP | 2012-126245 A | 7/2012 |
| WO | WO 2011/127289 A1 | 10/2011 |
| WO | WO 2012/086804 A1 | 6/2012 |

\* cited by examiner

SEAT FRAME FOR VEHICLE SEAT

CROSS REFERENCE TO RELATED APPLICATIONS

This application is a National Stage Entry application of PCT Application No. PCT/JP2012/072245, filed Aug. 31, 2012.

BACKGROUND

Disclosed herein a seat frame for a vehicle seat, and more particularly, a seat frame for a vehicle seat including side frames arranged on both right and left ends of a seat back frame, and a connection frame for connecting bottom ends of the side frames with each other.

In a seat frame for a vehicle seat, side frames are arranged on both ends of a seat back frame constructing a frame of a seat back, and bottom ends of the side frames are usually connected with each other by a connection frame.

Moreover, among prior-art side frames, there is such a side frame that an upper portion and a lower portion are independent members, and both portions are joined by welding or the like. For this side frame constructed by the two components, the connection frame is provided to connect the members forming the lower portions with each other (for example, refer to Japanese Patent Document No. 2008-201216 A ("the '216 Document").

On the other hand, when the welding is used to assemble the seat frame, the number of times of welding decreases as the number of the components of the seat frame decreases, which is preferred in terms of workability of the frame assembly. Therefore, in a vehicle seat according to Japanese Patent Document No. 2012-126245 A ("the '245 Document"), each of side frames arranged at right and left sides is constructed by a single member, and the side frames are connected with each other by welding a lower frame, which is the connection frame, to bottom ends of the respective side frames, thereby connecting the side frames with each other.

A description is now given of a frame structure of the vehicle seat according to the '245 Document, and the lower frame is constructed by a metal plate member extending as a straight line, and both ends on an extension direction of the lower frame are welded to rear surface flanges extending from rear surface edges of the side frames toward a seat inside. As a result, the side frames are connected with each other by the lower frame, and a rigidity of each of the side frames, particularly, a rigidity of the bottom end of each of the side frames is secured.

A rigidity of each of the side frames needs to be further increased, and particularly, a rigidity against such a load as to bend the side frame toward the inside of the seat needs to be secured. In other words, if the bottom ends of the side frames are connected by the connection frame to increase the rigidity, the connection frame needs to be attached to secure such a degree of rigidity to suppress the inward bends of the side frames.

Further, when the connection frame is attached to the side frames, the connection frame needs to be attached to further increase the rigidity while interference with members around attached locations are avoided.

Moreover, if the connection frame is attached to the side frames by way of welding, welded areas between the connection frame and the side frames need to be set to promote a welding operation.

Various embodiments of the present invention consider the foregoing problems, and an object of the embodiments is to provide a seat frame for a vehicle seat particularly realizing a structure capable of increasing the rigidity to such a degree as to suppress the inward bends of the side frames in the configuration in which the bottom ends of the side frames are connected by the connection frame.

Moreover, another object is to provide a seat frame for a vehicle seat realizing a structure capable of further increasing the rigidity while the interference with the members around the attached locations are avoided when the connection frame is attached to the side frames.

Moreover, still another purpose is to provide a seat frame for a vehicle seat in which welded areas between the connection frame and the side frames are set to promote the welding operation in the structure in which the connection frame is welded to the side frames.

The above-described problems may be solved by a seat frame for a vehicle seat including side frames arranged on both ends in a widthwise direction of the vehicle seat in a seat back frame provided for a seat back of a vehicle seat, the side frames each comprising a bottom end, and a connection frame for connecting the bottom ends of the side frames, which are attached to a seat cushion of the vehicle seat, with each other, where each of the side frames further includes a side wall arranged outside in the widthwise direction in the side frame, and extending in a top to bottom direction, and a rear wall extending inward from the side wall in the widthwise direction, the connection frame includes first extension portion extending along the widthwise direction, and second extension portions extending forward respectively from both ends in the widthwise direction of the first extension portion, and each of the second extension portions is located inside the side wall in the widthwise direction, and overlaps with the side wall.

When the connection frame is attached to the respective side frames in the seat frame for the vehicle seat, each of the second extension portions, which is a portion of the connection frame, is arranged inside the side wall of the side frame in such a state that each of the second extension portions overlaps with the side wall. This configuration increases the rigidity of the side walls of the side frames, particularly a rigidity against a load acting in the widthwise direction of the vehicle seat, and the inward bends of the side frames are suppressed. In other words, the rigidity can be increased to such a degree as to suppress the inward bends of the side frames in the above-mentioned seat frame for the vehicle seat.

Moreover, the above-mentioned seat frame of the vehicle seat preferably includes a reclining mechanism for swinging the seat back with respect to the seat cushion, where the reclining mechanism is attached to an outside surface located outside in the widthwise direction out of side surfaces of the side wall, the second extension portion abuts against an inside surface located on a rear side of the outside surface in the widthwise direction out of the side surfaces of the side wall, and an area of the side wall of which the second extension portion abuts against the inside surface deviates from an area of which the reclining mechanism is attached to the outside surface.

Welding marks for attaching the reclining mechanism and the like exist on the inside surface of the portion to which the reclining mechanism is attached on the side wall of the side frame, and some recesses and protrusions are thus formed. In the above-mentioned configuration, the connection frame is attached to avoid the portion where the recesses and protrusions are formed by the welding on the inside surface of the side wall of the side frame, and the connection frame can thus be satisfactorily attached.

Moreover, in the above-mentioned seat frame of the vehicle seat, preferably, the area of the side wall of which the reclining mechanism is attached to the outside surface is a circular area viewed in the widthwise direction, and at least a portion of the second extension portion extends in an arc shape along an outer edge of the circular area.

The above-mentioned configuration promotes an operation of attaching the connection frame to avoid the portion to which the reclining mechanism is attached on the side wall of each of the side frames.

Moreover, in the above-mentioned seat frame of the vehicle seat, more preferably, a swing shaft for the swing of the seat back by the reclining mechanism with respect to the seat cushion is provided in such a state as to pass through the side walls in the widthwise direction, and at least a portion of the second extension portion extends in an arc shape to go around from a rear of the swing shaft to a front thereof.

When the connection frame is attached while avoiding the portion to which the reclining mechanism is attached on the side wall of each of the side frames, the above-mentioned configuration enables the attachment of the connection frame to the side walls of the side frames in such a state that the interference with the swing shaft is avoided when the seat back swings with respect to the seat cushion.

Moreover, the connection frame extends in the arc shape to go around from the rear of the swing shaft to the front thereof, and the area in which the portion of the side wall of each of the side frames overlaps with the connection frame is thus somewhat longer in the front to back direction. As a result, the portion increased in the rigidity by the attachment of the connection frame out of the side wall of each of the side frames is provided to extend in the front to back direction of the vehicle seat. As a result, the rigidity of the side frame against the load acting in the widthwise direction of the vehicle seat further increases.

Moreover, in the above-mentioned seat frame of the vehicle seat, further preferably, a side wall side bent portion bending toward the inside in the widthwise direction is formed on a bottom end of the side wall, a second extension portion side bent portion bending toward the inside in the widthwise direction is formed on a bottom end of the second extension portion, and at least a portion of the second extension portion extends so that the second extension portion side bent portion aligns with the side wall side bent portion, and a portion of the second extension portion side bent portion overlaps with the side wall side bent portion.

In the above-mentioned configuration, a unity of the bottom end of the side wall of each of the side frames and the connection frame is enhanced, resulting in a further increase in the rigidity in the bottom end of the side wall of each of the side frames.

Moreover, in the above-mentioned seat frame of the vehicle seat, at least a portion of the area of the side wall of which the second extension portion abuts against the inside surface may be located above the area of which the reclining mechanism is attached to the outside surface, and a bent portion bending toward the inside in the widthwise direction is formed on a top end of the second extension portion.

In the above-mentioned configuration, the connection frame can be attached to avoid the portion to which the reclining mechanism is attached on the side wall of each of the side frames, and the rigidity of the connection frame itself simultaneously increases, which increases the rigidity of the side frames.

Moreover, in the above-mentioned seat frame of the vehicle seat, preferably, the area of the side wall of which the reclining mechanism is attached to the outside surface is a circular area viewed in the widthwise direction, the area of the side wall of which the second extension portion abuts against the inside surface is an area in a C shape along the outer edge of the circular area viewed in the widthwise direction, and the second extension portion includes an upper portion arranged above the circular area and a lower portion arranged below the circular area.

In the above-mentioned configuration, while the portion to which the reclining mechanism is attached on the side wall of each of the side frames is avoided, the connection frame can be attached to the side frames to further increase the rigidity.

Moreover, in the above-mentioned seat frame of the vehicle seat, more preferably, a swing shaft for the swing of the seat back by the reclining mechanism with respect to the seat cushion is provided in such a state as to pass through between the side walls in the widthwise direction, the upper portion and the lower portion are respectively welded to the side wall, a welded area between the upper portion and the side wall extends in a front to back direction of the vehicle seat so that at least a portion of the welded area is located in front of the swing shaft, and a welded area between the lower portion and the side wall extends in the front to back direction so that at least a portion of the welded area is located in the rear of the swing shaft.

In the above-mentioned configuration, the respective upper portion and lower portion of the second extension portion of the connection frame can be satisfactorily fixed to the side wall of each of the side frames. Further, each of the welded areas extends in the front to back direction of the vehicle seat, a strength against a load acting in the front to back direction can be secured, and the state in which the upper portion and the lower portion of the second extension portion are respectively fixed to the side wall of each of the side frames can be stably maintained.

Moreover, in the above-mentioned seat frame of the vehicle seat, a bottom end of the first extension portion at a center may be located further up than the bottom ends of the first extension portion at both ends in the widthwise direction in the connection frame provided for the vehicle seat which is a front seat arranged in front of a rear seat.

The feet of a passenger on the rear seat may enter into a space located below the connection frame of the front seat. If the bottom end at the center in the extension direction is located above the bottom ends of the ends in the extension direction in the first extension portion located above the feet of the passenger out of the connection frame, an interference of the feet of the passenger with the connection frame can be suppressed.

In the seat frame for the vehicle seat according to an embodiment, each of the second extension portions of the connection frame is arranged inside the side wall of the side frame in such a state that the second extension portion overlaps with the side wall, the rigidity of the side frame against the load acting in the widthwise direction of the vehicle seat thus increases, and the inward bend of the side frame is suppressed.

In the seat frame for the vehicle seat according to an embodiment, some recesses and protrusions are formed on the inside surface of the portion to which the reclining mechanism is attached on the side wall of the side frame, and the connection frame can be satisfactorily attached by attaching the connection frame to avoid the portion.

In the seat frame for the vehicle seat according to an embodiment, the operation of attaching the connection frame to avoid the portion to which the reclining mechanism is attached on the side wall of each of the side frames is promoted.

In the seat frame for the vehicle seat according to an embodiment, the connection frame can be attached to the side walls of the side frames in a state in which the interference with the swing shaft is avoided. Further, the portion increased in the rigidity by the attachment of the connection frame out of the side wall of each of the side frames is provided to extend in the front to back direction of the vehicle seat, and as a result, the rigidity of the side frames against the load acting in the widthwise direction of the vehicle seat further increases.

In the seat frame for the vehicle seat according to an embodiment, the unity of the bottom end of the side wall of each of the side frames and the connection frame is enhanced, resulting in a further increase in the rigidity in the bottom end of the side wall of each of the side frames.

In the seat frame for the vehicle seat according to an embodiment, the connection frame can be attached to avoid the portion to which the reclining mechanism is attached on the side wall of each of the side frames, and the rigidity of the connection frame itself simultaneously increases, which increases the rigidity of the side frames.

In the seat frame for the vehicle seat according to an embodiment, while the portion to which the reclining mechanism is attached on the side wall of each of the side frames is avoided, the connection frame can be attached to the side frames to further increase the rigidity.

In the seat frame for the vehicle seat according to an embodiment, the connection frame can be satisfactorily fixed to the side wall of each of the side frames, the strength against the load acting in the front to back direction can be secured, and the state in which the connection frame is fixed to the side wall of each of the side frames can be stably maintained.

In the seat frame for the vehicle seat according to an embodiment, the interference of the feet of the passenger on the rear seat with the connection frame can be suppressed, when the feet of the passenger on the rear seat enter into the space located below the connection frame of the front seat.

DETAILED DESCRIPTION

Hereinafter, a description is given of a seat frame for a vehicle seat according to various embodiments of the present invention referring to FIGS. 1 to 9. A height adjustment mechanism 4 and a slide rail mechanism R described later are not shown in FIG. 2 for the sake of clarity.

Hereinafter, a front to back direction is a direction matching a travel direction of the vehicle. Moreover, a widthwise direction is a direction along a lateral width of the vehicle, more specifically in a right to left direction, and corresponds to a widthwise direction of the vehicle seat. Moreover, a top to bottom direction is a top to bottom direction of the vehicle seat. A description given of positions and attitudes of respective portions of the seat in a normal state, in other words, a state in which a passenger is seated hereinafter unless otherwise specified.

First, a description is given of a basic configuration of the vehicle seat and the seat frame (hereinafter referred to as this seat S and this frame F) according to an embodiment of the present invention.

This seat S is approximately the same in a basic structure as a publicly known vehicle seat, and is used as a front seat arranged in front of a rear seat particularly in this embodiment. This seat S is not limited to the front seat, and the present invention can be applied to a seat frame for a vehicle seat, which is a rear seat.

Figure 1:
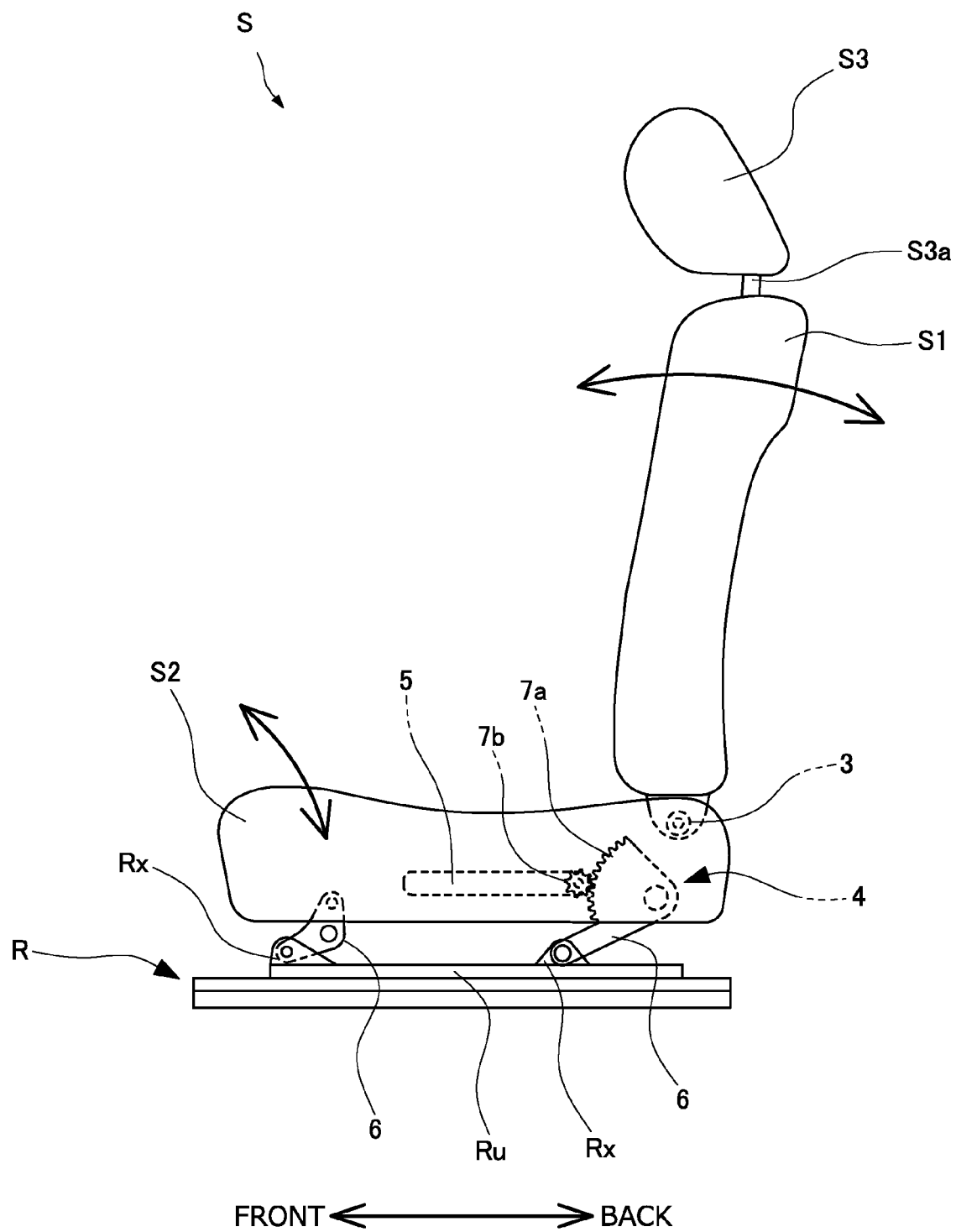
FIG. 1 is a schematic side view showing an exterior of a vehicle seat according to an embodiment of the present invention.
Figure 2:
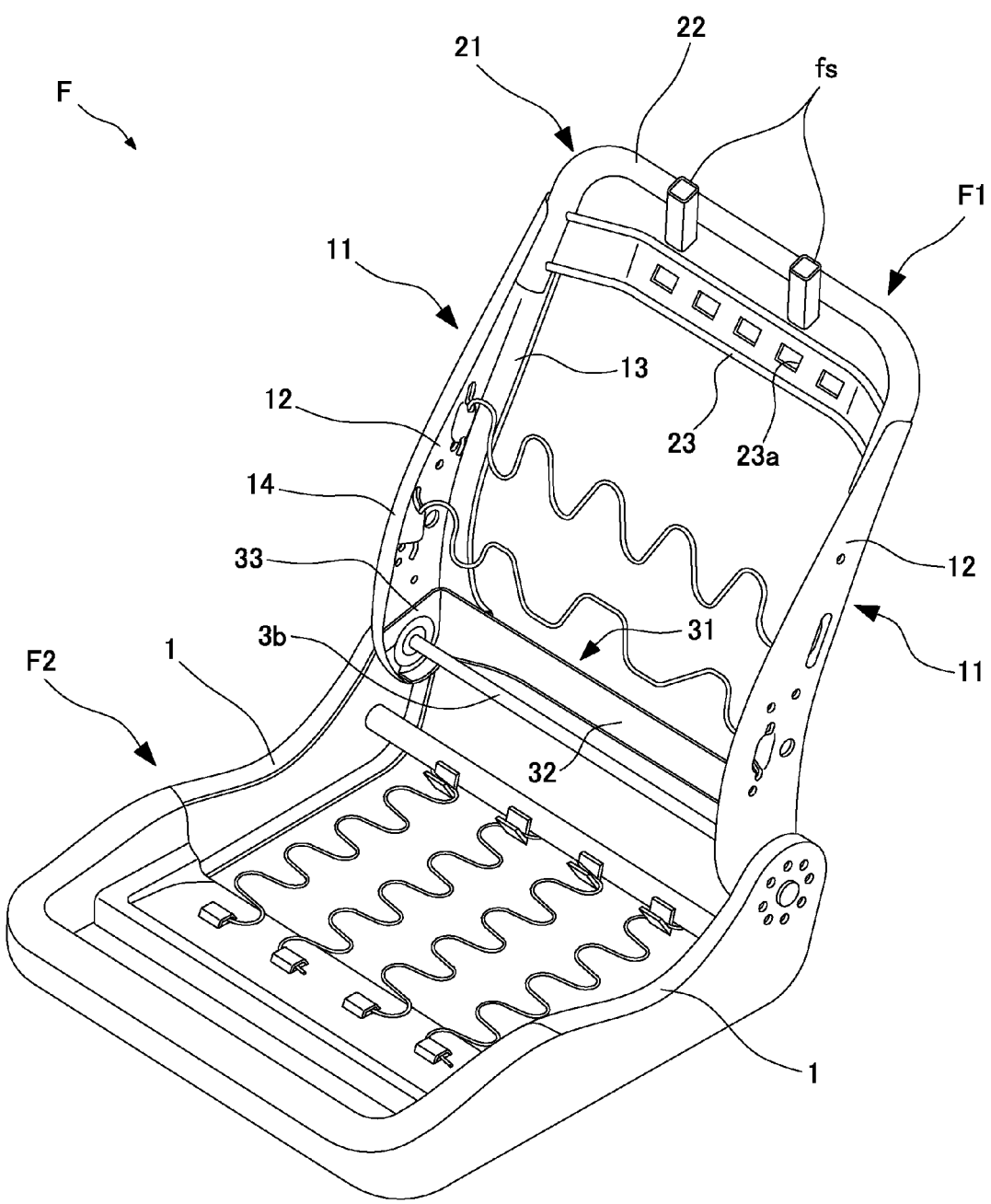
FIG. 2 is a perspective view showing an entire seat frame of the vehicle seat according to the embodiment of the present invention.

More specifically, this seat S includes a seat back S1, a seat cushion S2, and a headrest S3 as main components as shown in FIG. 1. On the other hand, this frame F constructing a framework of this seat S includes a seat back frame F1 provided for the seat back S1, and a seat cushion frame F2 provided for the seat cushion S2 as shown in FIG. 2. Moreover, guide stays fs for supporting the headrest S3 body when pillars S3a extending from a bottom of the headrest S3 are inserted into them are fixed to a top of the seat back frame F1.

Moreover, most of portions of this frame F are constructed by metal members. The assembled seat back frame F1 and the seat cushion frame F2 are constructed to respectively form rectangular frames as shown in FIG. 2.

Then, bottom ends of side frames 11 provided on both ends in the widthwise direction of the seat back frame F1 are assembled to rear ends of side portion frames 1 provided on both ends in the widthwise direction of the seat cushion frame F2. The bottom end of the side frame 11 is assembled through a reclining mechanism 3 shown in FIG. 4 to the rear end of the side portion frame 1 in this frame F.

The reclining mechanism 3 is activated by an operation of a passenger on an operation portion, not shown, and is configured to swing the seat back S1 forward or backward with respect to the seat cushion S2. The reclining mechanisms 3 are individually provided for the respective side frames 11 provided as a left-and-right pair, and are attached to bottoms of outside surfaces 12a of the respective side frames 11 in this seat S. Moreover, the reclining mechanisms 3 are welded to rear ends of inner wall surfaces of the side portion frames 1 opposite to the sides welded to the side frames 11.

A structure of each of the reclining mechanisms 3 is a known mechanism, and includes reclining mechanism bodies 3a, and a penetration shaft 3b extending in the widthwise direction in such a state as to pass through the reclining mechanism bodies 3a. Then, a drive mechanism which is provided in the body, and is not shown, is activated by a rotation of the penetration shaft 3b. As a result of the activation of the drive mechanism, a portion joined to the side frame 11 side out of the reclining mechanism 3a relatively swings about the penetration shaft 3b with respect to a portion on the opposite side thereof, specifically a portion joined to the side portion frame 1 side of the seat cushion frame F2. As a result, the side frame 11 relatively swings about the penetration shaft 3b with respect to the seat cushion S2. In other words, the seat back S1 swings about the penetration shaft 3b with respect to the seat cushion S2.

The penetration shaft 3b is a rotational shaft for rotating to drive the reclining mechanisms 3, and is also a swing shaft when the seat back S1 swings with respect to the seat cushion S2 by the reclining mechanisms 3. The penetration shaft 3b is a shaft shared between the reclining mechanism 3 attached to the one side frame 11 and the reclining mechanism 3 attached to the other side frame 11 in this seat S. In other words, the penetration shaft 3b passes through the side wall 12 of the one side frame 11, extends toward the other side frame 11 along the widthwise direction, and further penetrates the side wall 12 of this side frame 11.

Figure 5:
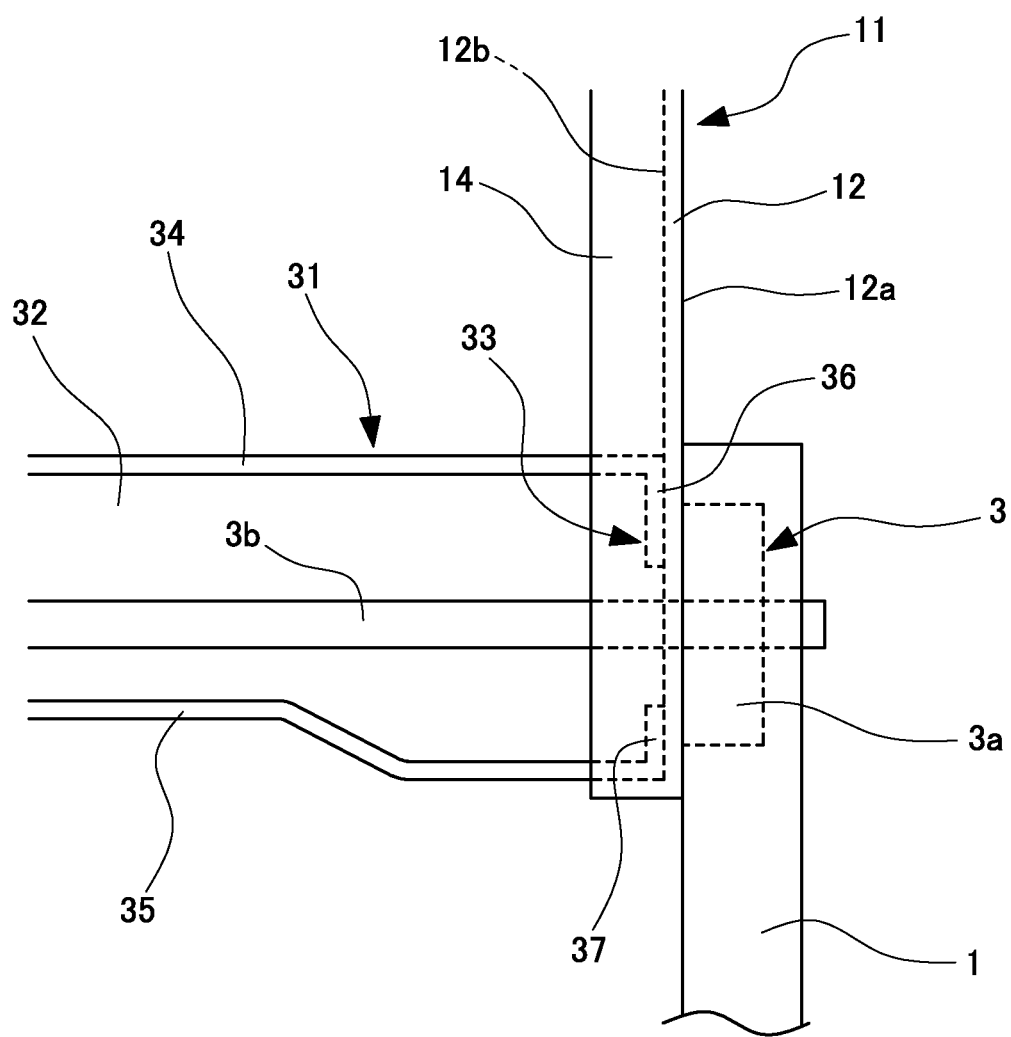
FIG. 5 is a front view showing a positional relationship among the side frame, a connection frame, and a reclining mechanism.

Then, each of both ends of the penetration shaft 3b passes through the corresponding reclining mechanism body 3a, and further passes through to the side portion frame 1 of the seat cushion frame F2 located by the reclining mechanism body 3a as shown in FIG. 5. In other words, the penetration shaft 3b is provided for rotation in such a state as to penetrate through the side walls 12 of the side frames 11 and the side portion frames 1 in the widthwise direction in this seat S.

The penetration shaft 3b may be rotated through an operation portion such as a lever by the passenger, or may be rotated by a power generated by a drive device such as an actuator or the like.

On the other hand, the slide rail mechanism R for sliding this seat S in the front to back direction with respect to a vehicle body floor is arranged at a position below the seat cushion S2. Then, a height adjustment mechanism 4 for adjusting a seat height is provided between the seat cushion S2 and the slide rail mechanism R in the top to bottom direction in this seat S. This height adjustment mechanism 4 is activated by the passenger operating the operation lever 5 shown in FIG. 1.

Specifically, the height adjustment mechanism 4 uses a drive force generated by the operation on the operation lever 5 to turn turn links 6 for connecting between the seat cushion frame F2 and the slide rail mechanism R, thereby adjusting the seat height.

More specifically, a total of four turn links 6 are provided to be located at both ends in the widthwise direction respectively at a front end and a rear end of the seat cushion frame F2. One end of each of the turn links 6 is turnably supported by a support portion Rx provided on an upper rail Ru of the slide rail mechanism R to protrude upward. Moreover, the other end of each of the turn links 6 is turnably attached to the side portion frame 1 of the seat cushion frame F2.

On the other hand, a sector gear 7a is formed on the rear turn link 6 located on one end side in the widthwise direction out of the turn links 6, and a pinion gear 7b meshes with the sector gear 7a. The pinion gear 7b is connected to the operation lever 5 through a connection shaft, which is not shown. As a result, when the operation lever 5 is operated, the pinion gear 7b rotates integrally with the connection shaft, and a meshing position between the pinion gear 7b and the sector gear 7a changes. As a result, the turn link 6 on which the sector gear 7a is formed turns, and the other turn links 6 turn in a form of following this turn link 6. As a result, the seat body including the seat cushion S2 rises and falls, resulting in adjustment of the seat height.

A detailed description is now given of the seat back frame F1 out of this frame F.

Figure 3:
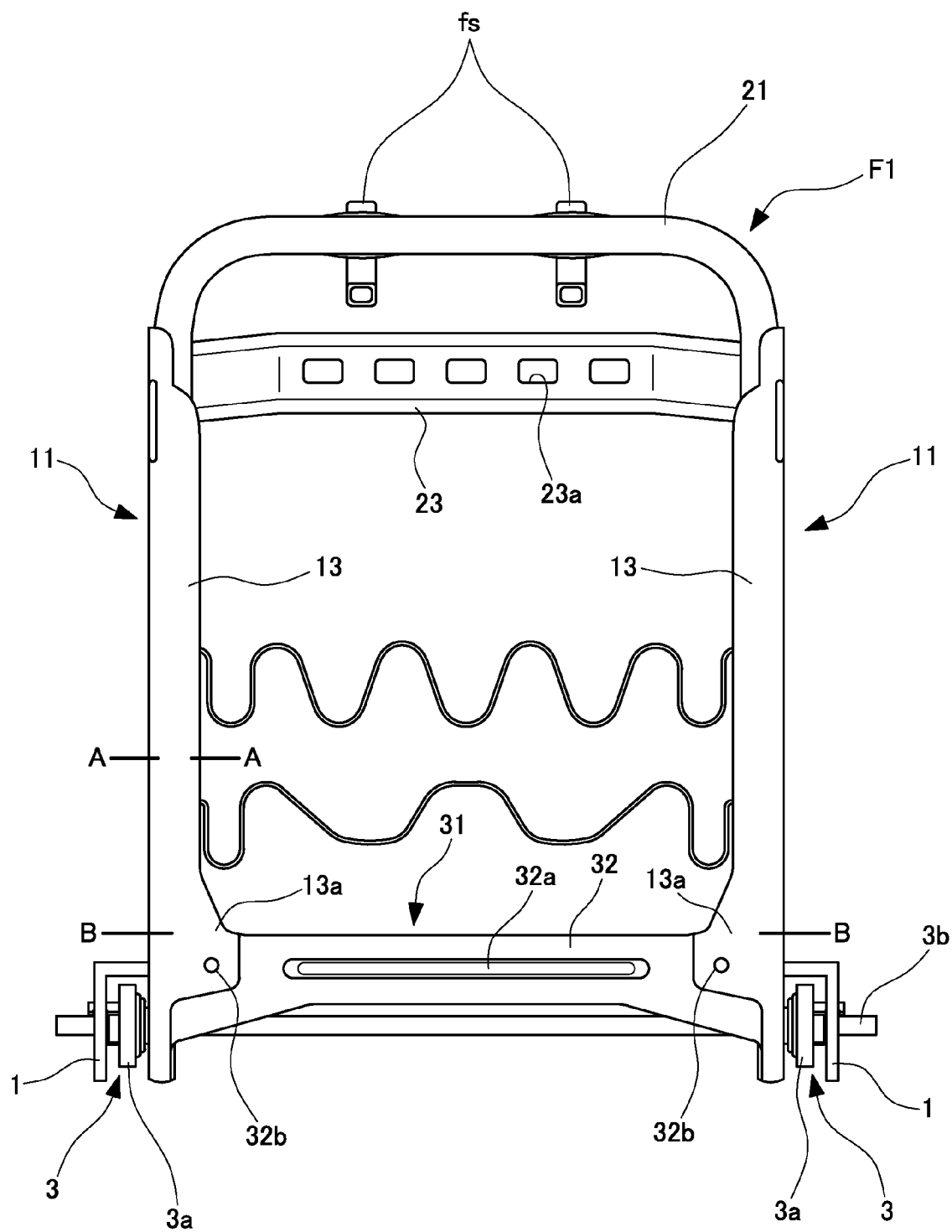
FIG. 3 is a rear view showing the seat frame of the vehicle seat according to the embodiment of the present invention.

The seat back frame F1 includes the side frames 11 arranged at both ends in the widthwise direction, an upper frame 21 for connecting top ends of the side frames 11 with each other, and a lower member frame 31 serving as a connection frame for connecting the bottom ends of the side frames 11 as shown in FIGS. 2 and 3.

The upper frame 21 is a portion forming a top end of the seat back frame F1 as shown in FIGS. 2 and 3. The upper frame 21 is constructed by a bent portion 22 including both ends bent in a downward U shape to direct downward and an upper member frame 23 bridging between one end and the other end of the bent portion 22.

The side frames 11 form both ends of the seat back frame F1 in the widthwise direction, and are portions extending from the top to bottom direction. Each side frame 11 is bent in an approximately arcuate shape so that a top end thereof is located somewhat in the rear of a bottom end in this seat S as shown in FIG. 2. Moreover, each side frame 11 is formed from a single member, and is specifically formed by machining a single metal plate in this seat S.

A more detailed description is given of the structure of each side frame 11. The side frames 11 arranged at the both ends in the widthwise direction have left-right symmetry structures, and a description is given of only the structure on the one side frame 11 hereinafter.

Figure 8:
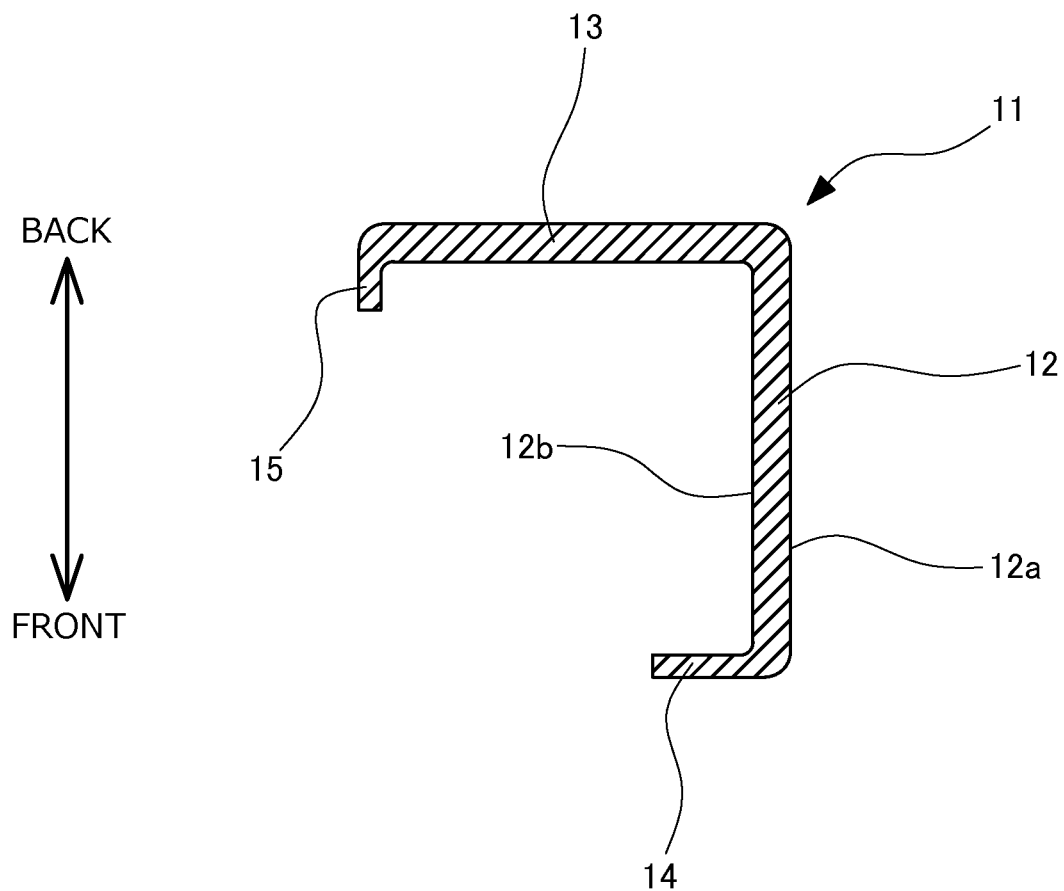
FIG. 8 is a cross sectional view showing a structure of the side frame made on a plane and in a direction indicated by A-A in FIG. 3.

Each side frame 11 includes the side wall 12 located on the outside in the widthwise direction, and a rear wall 13 extending from a rear end of the side wall 12 inward in the widthwise direction as shown in FIG. 8. The side wall 12 extends approximately straight in the top to bottom direction, a top end is in such a pointed shape as to narrow upward viewed from the side in the widthwise direction, a center has a gently curved shape, and a bottom has a semi-ellipsoidal shape.

Multiple holes are formed on the side wall 12, a hole 12c out thereof is formed at the bottom end of the side wall 12, and the penetration shaft 3b for driving the reclining mechanisms 3 is inserted into this hole. Further, one of the remaining holes is a hole for fixing the side frame 11 when the seat back frame F1 is assembled, particularly when members constructing the seat back frame F1 are assembled to each other, and a fixing jig, which is not shown, is inserted for the assembly into this hole.

Moreover, the reclining mechanism 3 is attached to the outside surface 12a located on the outside in the widthwise direction out of side surfaces of the side wall 12 as described before. More specifically, the reclining mechanism 3 is attached at a portion located somewhat above the bottom end of the side wall 12 by way of the laser welding in this seat S. When the reclining mechanism 3 is attached to the outside surface 12a of the side wall 12 by way of the laser welding, a laser irradiates on the inside surface 12b located on the rear side of the outside surface 12a in the widthwise direction out of the side surfaces of the side wall 12. Therefore, recesses and protrusions are formed as welding marks on the inside surface 12b.

Figure 7:
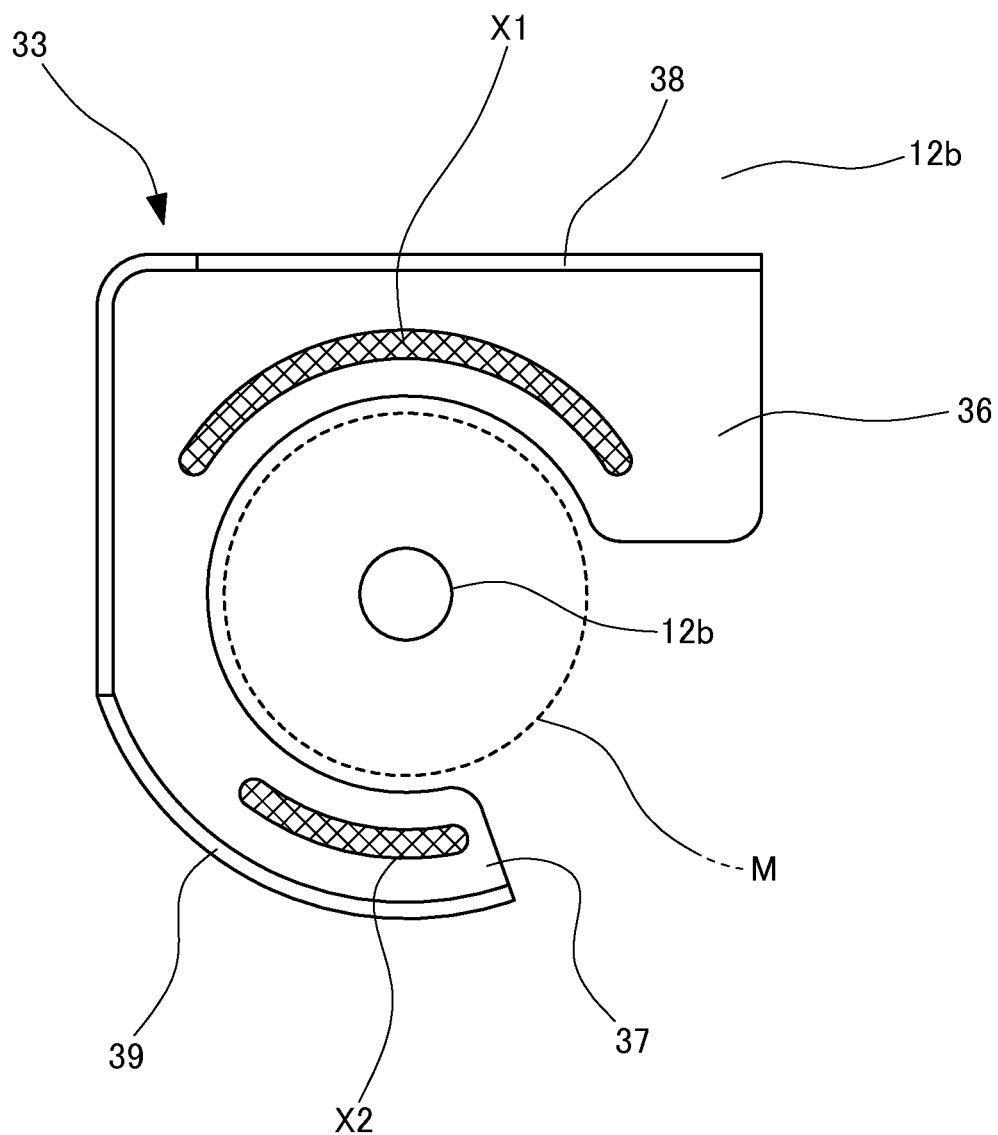
FIG. 7 is an explanatory side view of welded locations between the side frame and the connection frame.

A portion out of the reclining mechanism 3 joined to the side wall 12 of the side frame 11, more specifically, a portion of the reclining mechanism body 3a opposing the side wall 12 is circular in this seat S. Thus, an area of which the reclining mechanism 3 is attached to the outside surface 12a on the side wall 12 of each side frame 11 is a circular area M viewed in the widthwise direction as shown in FIG. 7 in this seat S. The hole into which the penetration shaft 3b is inserted is formed at a center position of the circular area M.

Figure 4:
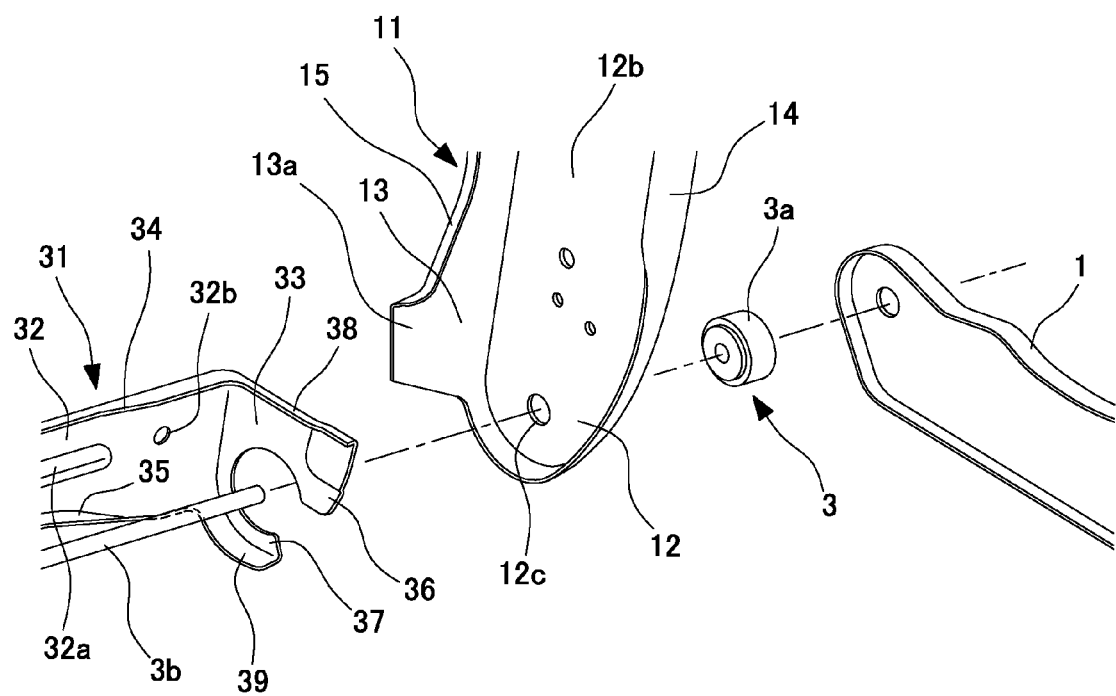
FIG. 4 is an exploded perspective view of a neighborhood of a side frame out of the seat frame.

Moreover, a side wall side flange 14 bent inward in the widthwise direction is formed at a front end of the side wall 12 as shown in FIGS. 4 and 8. This side wall side flange 14 corresponds to a side wall side bent portion, and is provided from the top end to the bottom end of the side wall 12 in order to reinforce the side wall 12. The bottom end of the side wall 12 has a semicircular shape as described before, and the side wall side flange 14 provided at the bottom end of the side wall 12 is formed in the arc shape to go around from the front to the rear along an outer edge of the bottom end of the side wall 12.

The rear wall 13 is adjacent to a rear end of the side wall 12 in such a state as to cross the side wall 12, and an angle between the rear wall 13 and the side wall 12 is approximately 90 degrees in this seat S. In other words, an outside end in the widthwise direction of the rear wall 13 forms a corner of the side frame 11 along with the rear end of the side wall 12.

Moreover, a top end of the rear wall 13 is at a position somewhat lower than the top end of the side wall 12, and a bottom end of the rear wall 13 is somewhat higher than the bottom end of the side wall 12. Then, a member frame attachment portion 13a in an approximately trapezoidal shape larger in an inward extension amount in the widthwise direction than a portion located above this portion is formed at the bottom end of the rear wall 13 as shown in FIG. 3. A lower member frame 31 described later is attached to this member frame attachment portion 13a.

Further, a rear wall side flange 15 bent forward is formed at an inside end in the widthwise direction of the rear wall 13 as shown in FIGS. 4 and 8. The rear wall side flange 15 is formed from the top end to the bottom end of the rear wall 13 in order to reinforce the rear wall 13, and extends to the top end of the member frame attachment portion 13a. Moreover, the rear wall side flange 15 is similarly formed in an area located below the main frame attachment portion 13a out of the rear wall 13. On the other hand, the flange 15 is not formed on a portion inside the widthwise direction and a portion on a bottom end side out of an outer edge portion of the member frame attachment portion 13a in order to avoid interference with the lower member frame 31.

The rear wall side flange 15 formed at the bottom end of the rear wall 13 joins at the outside end in the widthwise direction with the side wall side flange 14 formed to go around to the rear at the bottom end of the side wall 12 as shown in FIG. 4. As a result, the rigidity of the entire side frame 11 further increases.

Figure 9:
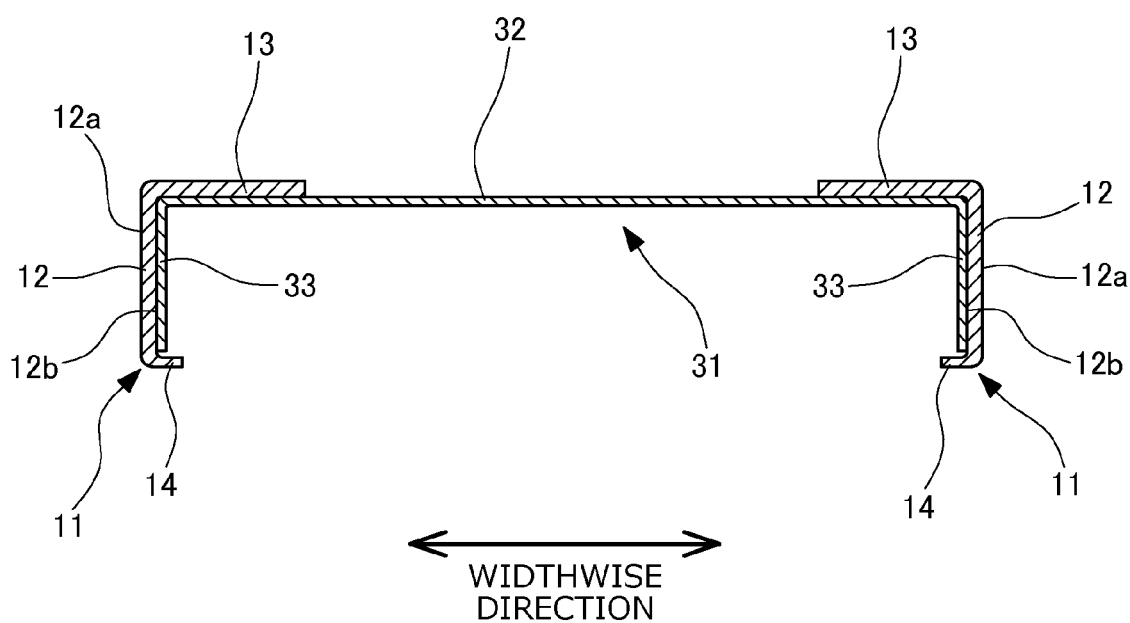
FIG. 9 is a cross sectional view of the connection frame attached to the side frame made on a plane and in a direction indicated by B-B in FIG. 3.

The lower member frame 31 is a member in an approximately U shape viewed from above as shown in FIGS. 2 and 9, and is formed by machining a single plate metal member. The lower member frame 31 includes a first extension portion 32 extending in the widthwise direction, and second extension portions 33 extending forward from both ends in the widthwise direction of the first extension portion 32.

The first extension portion 32 is a portion arranged between the side frames 11 in the widthwise direction, and attached to the rear walls 13 of the side frames 11, particularly the member frame attachment portions 13a. Specifically, each of both ends in the extension direction of the first extension portion 32 is attached to the member frame attachment portion 13a by way of the laser welding in a state in which teach end is in contact with a front surface of the member frame attachment portion 13a.

Figure 6:
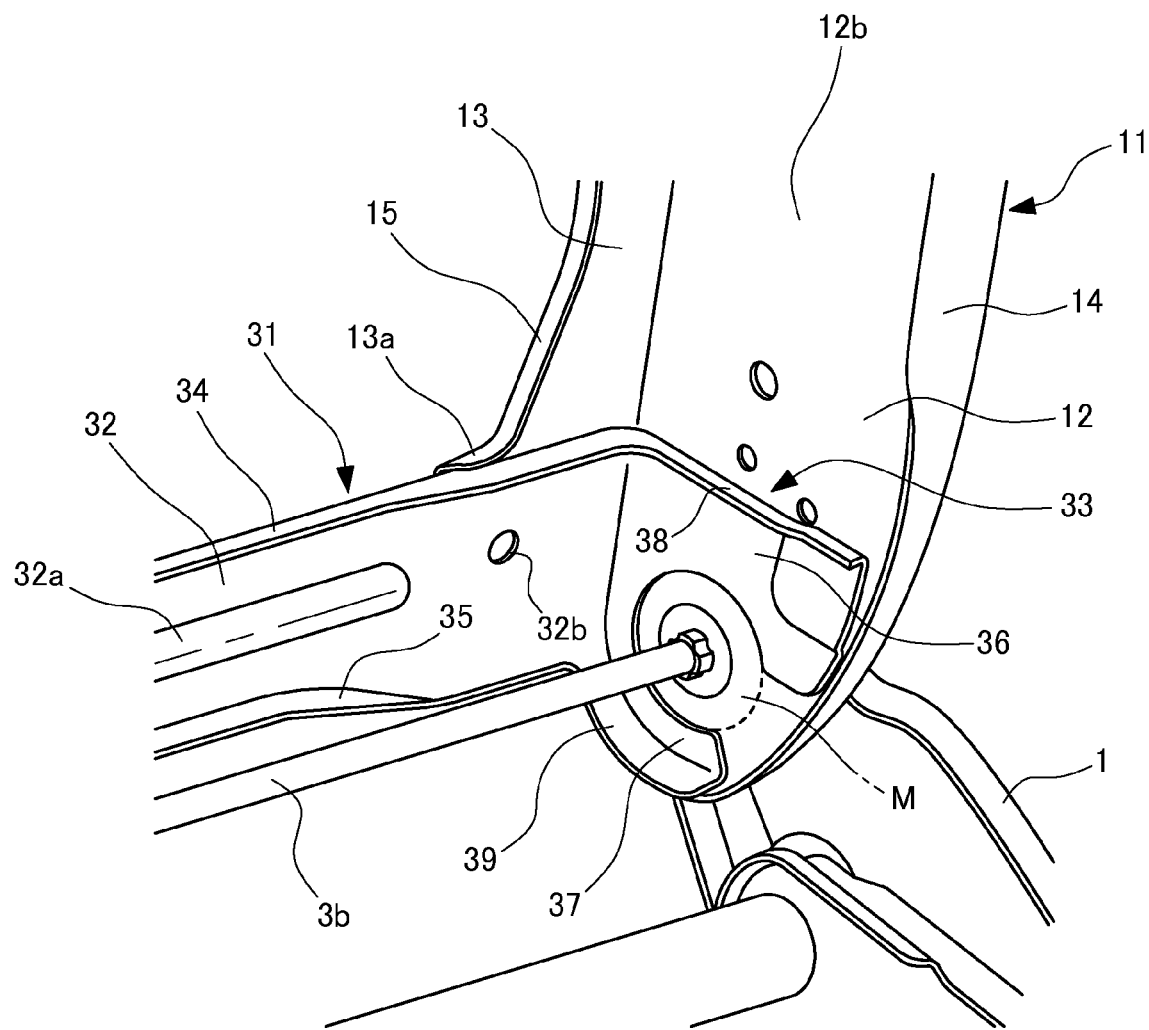
FIG. 6 is a perspective view showing a connection state between the side frame and the connection frame.

Moreover, a through hole 32b communicating with a hole (not shown) formed on the member frame attachment portion 13a when the first extension portion 32 is attached to the member frame attachment portion 13a is formed on an extension direction end of the first extension portion 32 as shown in FIG. 6. The hole 32b is used to fix the lower member frame 31 when the members constructing the seat back frame F1 are assembled with each other, and a fixing jig, not shown, is inserted into the hole 32b during the assembly.

A detailed description is now given of the shape of the first extension portion 32, and a bottom end position of the first extension portion 32 at a center in the extension direction is located somewhat above the bottom end position at the ends in the extension directions as appreciated from FIG. 3. In other words, the first extension portion 32 has such a shape that the bottom end somewhat rises at the center in the extension direction in this seat S. A use of this seat S as a front seat is promoted by the provision of the first extension portion 32 shaped in this way.

More clearly, feet of a passenger on the rear seat may enter a space located below the lower member frame 31 of the front seat. If the bottom end at the center in the extension direction is located above the bottom ends at the extension direction ends in the first extension portion 32 out of the lower member frame 31, an interference of the feet of the passenger with the lower member frame 31 can be suppressed.

On the other hand, the extension direction ends of the first extension portion 32 are wider in the top to bottom direction than the center in the extension direction, and the rigidity of the lower member frame 31 is secured as a result.

Moreover, a protrusion portion 32a protruding in an arc shape from a front surface (in other words, a portion recessed in an arc shape on a rear surface) is formed at a center in the top to bottom direction of the first extension portion 32 as shown in FIG. 3. The protrusion portion 32a is a so-called reinforcement bead, and is formed to a relatively long extent along the extension direction of the first extension portion 32.

Moreover, a first extension portion upper side flange 34 bent forward is formed at the top end of the first extension portion 32 as shown in FIGS. 4 and 6. The first extension portion upper side flange 34 is formed from the one end to the other end in the extension direction of the first extension portion 32 to reinforce the first extension portion 32.

Further, the above-described rear wall side flange 15 (particularly an inside end in the widthwise direction of the flange 15) formed at the top end of the member frame attachment portion 13a abuts against a portion somewhat closer to the center than the end position in the extension direction of the first extension portion 32 out of the first extension portion upper side flange 34 in this seat S as shown in FIG. 6. In other words, the lower member frame 31 is attached to the member frame attachment portion 13a as if the rear wall side flange 15 and the first extension portion upper side flange 34 continue to each other in this seat S. As a result, integrity between the lower member frame 31 and the side frame 11 is increased, and the rigidity of the neighborhood of a portion to which the lower member frame 31 is attached further increases in the side frame 11.

Moreover, a first extension portion lower side flange 35 bent to the front side is formed at the bottom end of the first extension portion 32 from the one end to the other end in the extension direction of the first extension portion 32. As a result, the rigidity of the lower member frame 31 further increases.

The second extension portions 33 are adjacent to the both ends in the extension direction of the first extension portion 32 in such a state as to cross the first extension portion 32, an angle between the first extension portion 32 and the second extension portion 33 is approximately 90 degrees in this seat S. In other words, the rear end of the second extension portion 33, along with the extension direction end of the first extension portion 32, forms a corner of the lower frame member 31.

Then, the lower member frame 31 is attached to the member frame attachment portion 13a so that the corner of the lower member frame 31 overlaps with the corner of the side frame 11 in this seat frame S as shown in FIG. 6. In other words, the second extension portion 33 is located inside the side wall 12 of the side frame 11 in the widthwise direction, and overlaps with the side wall 12. More specifically, the second extension portion 33 is attached to the side wall 12 by way of the laser welding in such a state as to abut against the inside surface 12b of the side wall 12.

As described above, the second extension portion 33 of the lower member frame 31 is arranged in such a state as to abut against the inside surface 12b of the side wall 12 of the side frame 11 in this seat S, the rigidity of the side wall 12 of the side frame 11, particularly rigidity against the load acting in the widthwise direction increases, and the inward bend of the side frame 11 is suppressed. In other words, the rigidity can be increased to such a degree as to suppress the inward bend of the side frame 11 by arranging the second extension portion 33 inside the side wall 12 of the side frame 11 in the overlapping state.

A detailed description is now given of a shape of the second extension portion 33, and the second extension portion 33 is formed into a C shape viewed in the widthwise direction as illustrated in FIGS. 6 and 7. In other words, the second extension portion 33 provided for this seat S is punched off at a center into a circular shape. Moreover, a half area in the bottom side of the front end of the second extension portion 33 is cut off in such a state as to continue to the circular punched-off portion. The second extension portion 33 is configured to include an upper portion 36 arranged above the circular punched-off portion and a lower portion 37 arranged below the circular punched-off portion as a result of the punching or cutting. Then, both the upper portion 36 and the lower portion 37 are joined to the side wall 12 by way of the laser welding in such a state as to abut against the inside surface 12b of the side wall 12 of the side frame 11.

On the other hand, it should be understood that the circular punched-off portion in the second extension portion 33 is not joined to the side wall 12 of the side frame 11. Then, the reclining mechanism 3 is arranged at a position opposite to the circular punched-off portion in this seat S across the side wall 12. In other words, the area in which the circular punched-off portion is located in the side wall 12 of the side frame 11 corresponds to an area of the outside surface 12a to which the reclining mechanism 3 is attached in this seat S.

In other words, areas of the inside surface 12b against which the upper portion 36 and the lower portion 37 of the second extension portion 33 abut on the side wall 12 of the side frame 11 are deviated from the area of the outside surface 12a to which the reclining mechanism 3 is attached in this seat S. In the area of the outside surface to which the reclining mechanism 3 is attached in the side wall 12, recesses and protrusions are formed as laser welding marks on the inside surface 12b thereof. The second extension portion 33 is attached to the inside surface 12b of the side wall 12 to avoid the portion on which the recesses and protrusions are formed, and the lower member frame 31 including the second extension portions 33 are thus satisfactorily attached.

The area of the outside surface 12a to which the reclining mechanism 3 is attached is circular viewed in the widthwise direction in the side wall 12 as described before in this seat S. On the other hand, the center of the second extension portion 33 of the lower member frame 31 is punched off in the circular shape to match the circular area M. Then, the second extension portion 33 is joined to the side wall 12 so that an outer edge of the circular area M and an inner edge of the circular punched-off portion in the second extension portion 33 match each other in this seat S In other words, the area of which the second extension portion 33 abuts against the inside surface 12b is the area in the C shape along the outer edge of the circular area M in the side wall 12 in this seat S. More specifically, a portion located in the lower side of a center in the front to back direction of the upper portion 36 of the second extension portion 33 is cut off in a semicircular shape as shown in FIGS. 6 and 7. Then, the second extension portion 33 is attached to the side wall 12 along an edge of the cutout and an upper portion of the outer edge of the circular area M. In other words, the upper portion 36 out of the second extension portion 33 is a portion arranged above the circular area M.

On the other hand, the lower portion 37 of the second extension portion 33 extends forward in an arc shape as shown in FIGS. 6 and 7. Then, the second extension portion 33 is attached to the side wall 12 so that the lower portion 37 aligns with a lower portion of the outer edge of the circular area M. In other words, the lower portion 37 out of the second extension portion 33 is a portion arranged below the circular area M, and extends in the arc shape along the outer edge of the circular area M.

As described above, the second extension portion 33 is in the C shape along the outer edge of the area M (the area on the side wall 12 of the side frame 11 to which the reclining mechanism 3 is attached) viewed in the widthwise direction in this seat S. Then, the second extension portion 33 is joined to the side wall 12 so that the circular area M and the circular punched-off portion in the second extension portion 33 match each other. Conversely, the circular area M and the circular punched-off portion in the second extension portion 33 only need to align with each other when the second extension portion 33 is joined to the side wall 12. As a result, the operation of attaching the lower member frame 31 to avoid the portion to which the reclining mechanism 3 is attached on the side wall 12 of each of the side frames 11 is promoted.

Particularly when the seat back frame F1 of this seat S is assembled, first, the reclining mechanism 3 is attached to the side wall 12 of each side frame 11 by way of the laser welding, and, then, the lower member frame 31 is attached to the side frames 11. When the seat back frame F1 is assembled in this assembly sequence, if the circular area M and the circular punched-off portion in the second extension portion 33 are aligned with each other, the attachment of the lower member frame 31 to avoid the attachment portion of the reclining mechanism 3 in the side wall 12 of the side frame 11 is further promoted. In other words, the configuration of punching the center of the second extension portion 33 in the circular shape to align with the outer edge of the circular area M is more effective when the seat frame F1 is assembled in the assembly sequence.

That the lower portion 37 of the second extension portion 33 extends in the arc shape to go around from the rear of the penetration shaft 3b to the front of the penetration shaft 3b in the state where the second extension portion 33 is joined to the side wall 12 in this seat S. Similarly, the upper portion 36 of the second extension portion 33 extends from the rear of the penetration shaft 3b to the front of the penetration shaft 3b. This configuration enables the attachment of the lower member frame 31 to the side walls 12 of the side frames 11 while the attachment portions of the reclining mechanism 3 on the side walls 12 of the side frames 11 are avoided, and the interference with the penetration shaft 3b is further avoided. Moreover, the portion increased in the rigidity by the attachment of the lower member frame 31 out of the side wall 12 of the side frame 11 extends in the front to the back direction, and the rigidity of the side frame 11 further increases against the load acting in the widthwise direction Moreover, the upper portion 36 and the lower portion 37 of the second extension portion 33 are respectively laser-welded to the side wall 12 of the side frame 11 as described before in this seat S. Then, a welded area X1 between the upper portion 36 and the side wall 12 extends in an arc shape in the front to the rear direction so that a portion of the welded area X1 locates in front of the penetration shaft 3b as shown in FIG. 7 in this seat S. Similarly, a welded area X2 between the lower portion 37 and the side wall 12 extends in an arc shape in the front to the rear direction so that a portion of the welded area X2 is located in the rear of the penetration shaft 3b.

As described above, each of the welded areas X1 and X2 is an area having a certain length in the front to the back direction in this seat S, and the upper portion 36 and the lower portion 37 of the second extension portion 33 are thus respectively fixed to the side wall 12 of the side frame 11 satisfactorily. Further, each of the welded areas X1 and X2 extend in the front to the back direction, and a strength against the load acting in the front to the back direction can be secured. As a result, even if a load in the front to the back direction acts on the side frame 11 and the lower member frame 31, a detachment in the welded areas X1 and X2 can be suppressed, and the joint state between the second extension portions 33 of the lower member frame 31 and the side walls 12 of the side frames 11 can be stably maintained.

The welded area X1 between the upper portion 36 and the side wall 12 is the arc area corresponding to approximately ⅓ of the circumference about the penetration shaft 3b, and the welded area X2 between the lower portion 37 and the side wall 12 is an arc area corresponding to approximately ⅙ of the circumference in this seat S. Further, both the welded areas X1 and X2 are separated from each other. Both the welded areas X1 and X2 do not correspond to the entire circumference about the penetration shaft 3b, and are separated from each other in this way. Therefore, when the seat back frame F1 is assembled, a welding operation can be carried out more easily than a case in which the entire circumference about the penetration shaft 3b is continuously laser-welded.

Flanges bent inward in the widthwise direction are respectively formed on the upper portion 36 and the lower portion 37 of the second extension portion 33 as shown in FIGS. 4 and 6. Specifically, a second extension portion top side flange 38 including a top end bent inward in the widthwise direction is formed on the upper portion 36 of the second extension portion 33. The second extension portion top side flange 38 corresponds to a bent portion, and is formed from a front end to a rear end of the upper portion 36 in order to reinforce the second extension portion 33.

The formation of the flange 38 for the reinforcement at the top end of the upper portion 36 of the second extension portion 33 as describe above increases the rigidity of the lower member frame 31 itself, and, as a result, the rigidity of the side frame 11 to which this frame 31 is attached also increases.

The second extension portion top side flange 38 continues to the first extension portion top side flange 34 formed at the top end of the first extension portion 32 as illustrated in FIG. 4. As a result, the rigidity of the entire lower member frame 31 further increases.

On the other hand, a second extension portion bottom side flange 39 including a bottom end bent inward in the widthwise direction is formed on the lower portion 37 of the second extension portion 33 as shown in FIGS. 4 and 6. The second extension portion bottom side flange 39 corresponds to a second extension portion side bent portion, and is formed from a front end to a rear end of the lower portion 37 in order to reinforce the second extension portion 33. The lower portion 37 extends in the arc shape to go around from the rear side to the front side of the penetration shaft 3b as described before, and the second extension portion bottom side flange 39 thus also extends in an arc shape.

Then, the front end of the second extension portion bottom side flange 39 overlaps with a rear end extending in an arc shape at a bottom end position of the side wall 12 out of the side wall side flange 14 formed on the side wall 12 of the side frame 11 in the state in which the second extension portion 33 is joined to the side wall 12 as shown in FIG. 6 in this seat S.

More specifically, the lower portion 37 of the second extension portion 33 extends so that the second extension portion bottom side flange 39 aligns with the side wall side flange 14, and the front end of the second extension portion bottom side flange 39 overlaps with the rear end of the side wall side flange 14. In other words, the lower member frame 31 is attached to the side frame 11 as if the second extension portion bottom side flange 39 and the side wall side flange 14 continued to each other in this seat S. As a result, integrity between the lower member frame 31 and the side frame 11, particularly integrity with the bottom end of the side wall 12 is increased, and the rigidity of the neighborhood of the portion to which the lower member frame 31 is attached further increases in the side frame 11.

Further, the second extension portion bottom side flange 39 connects to the first extension portion bottom side flange 35 formed at the bottom end of the first extension portion 32 as shown in FIG. 4. As a result, the rigidity of the entire lower member frame 31 further increases.

A description is given of the configuration example of the seat frame for the vehicle seat according to various embodiments of the present invention, but these are merely examples for promoting the understanding of the present invention, and do not limit the present invention. In other words, it should be understood that the shapes, dimensions, arrangements, and the like described before can be changed or improved without departing from the purpose of the present invention, and equivalents thereof are included.

Moreover, the second extension portion 33 of the lower member frame 31 abuts against the inside surface 12b on the side wall 12 of the side frame 11 in the embodiment. On the other hand, the area of which the reclining mechanism 3 is attached on the outside surface 12a is the circular area M viewed in the widthwise direction on the side wall 12. Then, the area of which the second extension portion 33 abuts against the inside surface 12b is the area in the C shape along the outer edge of the circular area M in the side wall 12. In other words, the second extension portion 33 includes the upper portion 36 arranged above the circular area M and the lower portion 37 arranged below the circular area M. However, the configuration is not limited to this case, and the second extension portion 33 may have such a configuration as to include a portion corresponding to only one of the upper portion 36 and the lower portion 37.

Moreover, though the flanges (second extension portion top side flange 38 and the second extension portion bottom side flange 39) for the reinforcement are provided respectively for the upper portion 36 and the lower portion 37 according to the embodiment, the configuration is not limited to this example, and a configuration without including the formed flanges for reinforcement may be adopted.

REFERENCE NUMERALS

S this seat
S1 seat back
S2 seat cushion
S3 headrest
S3a pillar
F this frame
F1 seat back frame
F2 seat cushion frame
fs guide stay
R slide rail mechanism
Ru upper rail
Rx support portion
M circular area
X1, X2 welded area
1 side portion frame
3 reclining mechanism
   3a reclining mechanism main body
   3b penetration shaft
4 height adjustment mechanism
5 operation lever
6 turn link
7a sector gear
7b pinion gear
11 side frame
12 side wall
   12a outside surface
   12b inside surface
   12c hole
13 rear wall
   13a member frame attachment portion
14 side wall side flange
15 rear wall side flange
21 upper frame
22 bent portion
23 upper member frame
31 lower member frame (connection frame)
32 first extension portion
   32a protrusion portion
   32b hole
33 second extension portion
34 first extension portion top side flange
35 first extension portion bottom side flange
36 upper portion
37 lower portion
38 second extension portion top side flange
39 second extension portion bottom side flange

The invention claimed is:

1. A seat frame for a vehicle seat comprising:
side frames, each of said side frames arranged on each end in a widthwise direction of the vehicle seat in a seat back frame provided for a seat back of the vehicle seat and comprising a bottom end; and
a connection frame for connecting the bottom ends of the side frames, which are attached to a seat cushion of the vehicle seat, with each other, wherein:
each of the side frames further comprises:
   a side wall arranged outside in the widthwise direction, and extending in an up to down direction in the side frame; and
   a rear wall extending inward from the side wall in the widthwise direction;
the connection frame comprises:
   a first extension portion extending along the widthwise direction; and
   a second extension portion extending forward respectively from each end in the widthwise direction of the first extension portion; and
   the second extension portion is located inside the side wall in the widthwise direction, and overlaps with the side wall;
the seat frame further comprises a reclining mechanism for swinging the seat back with respect to the seat cushion;
the reclining mechanism is attached to an outside surface located outside in the widthwise direction out of side surfaces of the side wall;
the second extension portion abuts against an inside surface located on a rear side of the outside surface in the widthwise direction out of the side surfaces of the side wall; and
an area of the side wall of which the second extension portion abuts against the inside surface deviates from an area of which the reclining mechanism is attached to the outside surface.

2. The seat frame for the vehicle seat according to claim 1, wherein:
the area of the side wall of which the reclining mechanism is attached to the outside surface is a circular area viewed in the widthwise direction; and
at least a portion of the second extension portion extends in an arc shape along an outer edge of the circular area.

3. The seat frame for the vehicle seat according to claim 2, wherein:
the reclining mechanism includes a swing shaft, around which the seat back swings with respect to the seat cushion, that passes through the side walls in the widthwise direction; and
at least a portion of the second extension portion extends in an arc shape to go around from a rear of the swing shaft to a front thereof.

4. The seat frame for the vehicle seat according to claim 2, wherein:
a side wall side bent portion bending toward the inside in the widthwise direction is provided on a bottom end of the side wall;
a second extension portion side bent portion bending toward the inside in the widthwise direction is provided on a bottom end of the second extension portion; and
at least a portion of the second extension portion extends so that the second extension portion side bent portion aligns with the side wall side bent portion, and a portion of the second extension portion side bent portion overlaps with the side wall side bent portion.

5. The seat frame for the vehicle seat according to claim 1, wherein:
at least a portion of the area of the side wall of which the second extension portion abuts against the inside surface is located above the area of which the reclining mechanism is attached to the outside surface; and
a bent portion bending inward in the widthwise direction is provided on a top end of the second extension portion.

6. The seat frame for the vehicle seat according to claim 1, wherein:
the area of the side wall of which the reclining mechanism is attached to the outside surface is a circular area viewed in the widthwise direction;
the area of the side wall of which the second extension portion abuts against the inside surface is an area in a C shape along the outer edge of the circular area viewed in the widthwise direction; and
the second extension portion comprises an upper portion arranged above the circular area and a lower portion arranged below the circular area.

7. The seat frame for the vehicle seat according to claim 6, wherein:
the reclining mechanism includes a swing shaft, around which the seat back swings with respect to the seat cushion, that passes through between the side walls in the widthwise direction;
the upper portion and the lower portion are respectively welded to the side wall;
a first welded area between the upper portion and the side wall extends in a front to back direction of the vehicle seat so that at least a portion of the welded area is located in front of the swing shaft; and
a second welded area between the lower portion and the side wall extends in the front to back direction so that at least a portion of the welded area is located in the rear of the swing shaft.

8. The seat frame for the vehicle seat according to claim 1, wherein a bottom end of the first extension portion at a center is located higher than the bottom ends of the first extension portion at both ends in the widthwise direction in the connection frame provided for the vehicle seat which is a front seat arranged in front of a rear seat.

* * * * *